United States Patent [19]  [11] 4,449,283
Berecz et al.  [45] May 22, 1984

[54] SEMI-AUTOMATIC INSERT TOOL

[75] Inventors: Imre Berecz, El Toro; Dennis Schultz, Riverside; Leroy O. Daniel, Anaheim, all of Calif.

[73] Assignee: Microdot Inc., Darien, Conn.

[21] Appl. No.: 369,022

[22] Filed: Jun. 16, 1982

[51] Int. Cl.³ .............................................. B23P 19/02
[52] U.S. Cl. .................................... 29/566.1; 29/811; 29/240.5; 227/136
[58] Field of Search .................... 29/566.1, 240.5, 429, 29/566.2, 566.4, 750, 851, 752, 564.6, 429, 782, 783, 820, 809; 227/136

[56] References Cited

U.S. PATENT DOCUMENTS

| 3,259,292 | 7/1966 | Maynard | 227/136 X |
| 3,464,542 | 9/1969 | Downing et al. | 29/240.5 X |
| 3,556,743 | 1/1971 | Yeager | 29/240.5 X |
| 3,579,793 | 5/1971 | Williams et al. | 29/240.5 |
| 3,739,446 | 6/1973 | Long, Jr. et al. | 29/566.2 X |
| 3,826,419 | 7/1974 | Maestri | 227/136 |
| 3,901,428 | 8/1975 | Grass | 227/136 X |
| 3,911,712 | 10/1975 | Wustinger et al. | 29/751 X |
| 4,035,900 | 7/1977 | Boyko et al. | 29/809 X |

Primary Examiner—William R. Briggs
Assistant Examiner—Glenn L. Webb
Attorney, Agent, or Firm—Lyman R. Lyon

[57] ABSTRACT

The disclosure relates to a semi-automatic helical insert tool that supports a pair of coils of feed strip having helical inserts thereon. The feed strip is fed through a strip guide to an indexing dial which advances an insert into drive position upon reciprocation of a manually operable trigger on the tool. Actuation of the trigger of the tool not only advances the helical insert into drive position but actuates an air motor to effect advancement of a drive tool into engagement with the insert and drive of the insert into a complementary aperture in a workpiece.

1 Claim, 5 Drawing Figures

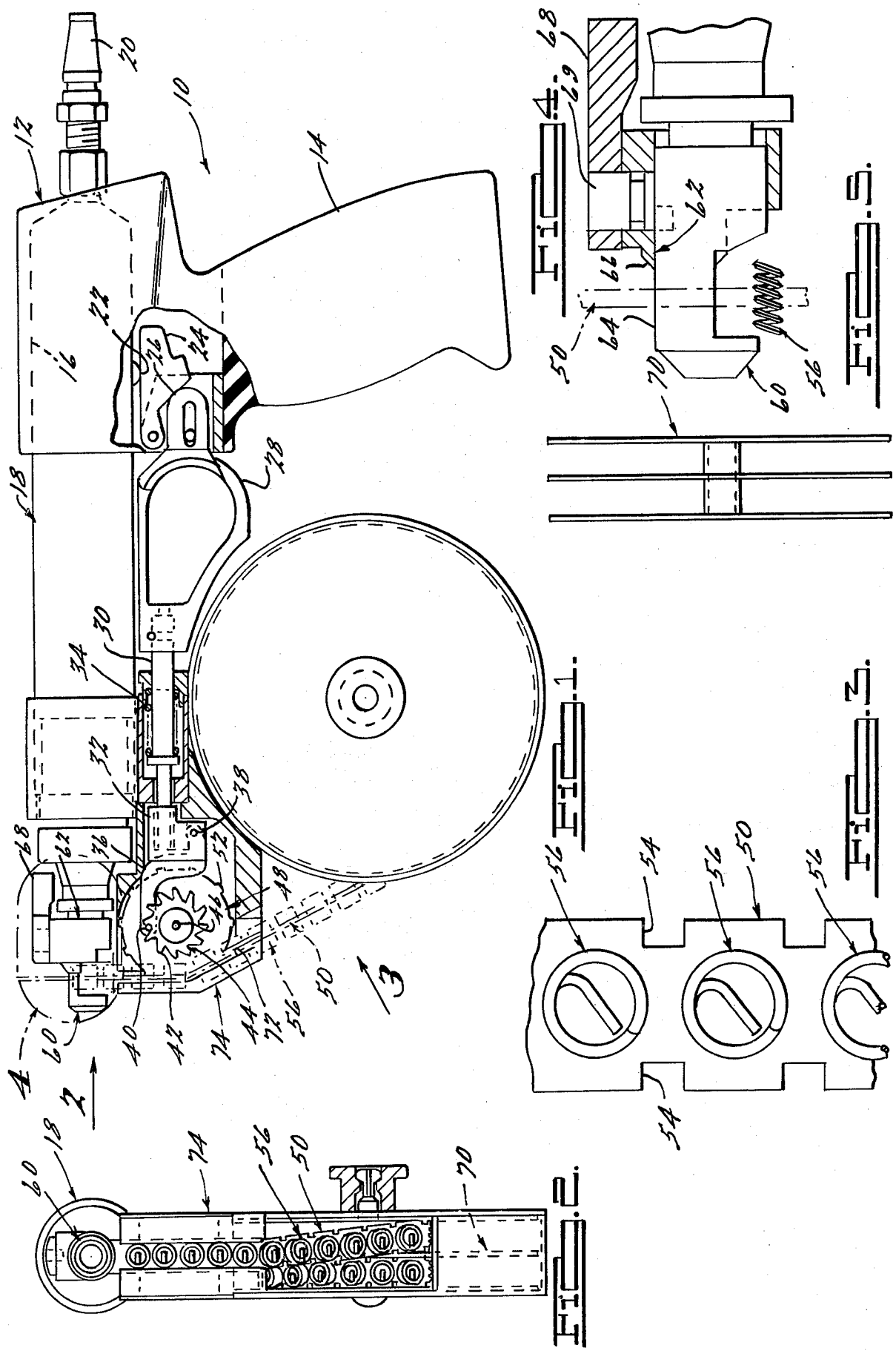

SEMI-AUTOMATIC INSERT TOOL

BACKGROUND OF THE INVENTION

Thread inserts are often utilized in relatively soft materials that are required to repeatedly accept complementary fasteners. Such inserts are generally made from relatively hard material and have an external thread that is engageable in the soft material and an internal thread of relatively smaller pitch diameter that accommodates the complementary threaded fastener. The resultant fastening installation exhibits a significant increase in structural strengh and integrity over installations wherein the fastener is threaded directly into the softer material.

Since locking inserts are an additional structural element in any assembly over and above the threaded aperture in the parent material, installation thereof entails an increase in labor as well as the material cost of the insert. Accordingly, every effort is made to assemble the inserts into complementary holes in a parent material at maximum speed consistent with structural integrity of the completed assembly.

It has heretofore been proposed to drive helical inserts into complementary threaded holes in a parent material by either a hand tool having a nose portion engageable with a tang on the insert or by air powered tools having a driving nose that is engageable with a tang on the insert in the manner similar to the manual tool. Tools for inserting inserts into a relatively soft workpiece are taught in U.S. Pat. Nos. 2,371,622; 2,855,661; 3,093,895; 3,111,751 and 3,579,793. While the power tool of U.S. Pat. No. 3,579,793 materially speeds up the installation process, the limiting factor in speed of application is the feed of the inserts to the tool. While inserts have been mounted on strips for feed to a tool as taught in Swedish Letters Patent No. 341,994, a need has developed in the marketplace for a tool that is positive in operation and that maximizes magazine capacity. The tool should preferably be semi-automatic in nature requiring a single actuation to effect both advancement of an insert into drive position, actuation of the driving tool, and drive of the insert into a complementary hole in a workpiece.

SUMMARY OF THE INVENTION

A semi-automatic helical insert tool in accordance with the instant invention features a frame of pistol grip configuration for the acceptance of a conventional air motor. The air motor and insert driving head thereon is similar to the tool disclosed and claimed in U.S. Pat. No. 3,579,793. Accordingly, no detailed description thereof is made herein for the purpose of simplicity.

The tool of the instant invention features a pair of coaxially related rotary magazines that advance a feed strip having inserts thereon to an installation position. Two spools of feed strip are stored in the magazine and are selectively fed to the drive mechanism of the tool.

Advancement of the feed strip and inserts thereon to a drive position is accomplished by a novel strip feed indexing dial which has lugs thereon that engage in complementary notches in the feed strip to effect advancement thereof upon rotation of the dial. Rotation of the dial is effected by an index gear which is actuated by a ratchet arm and trigger assembly. A single pull on the trigger effects mechanical advancement of the feed strip and helical insert to a drive position and subsequently effects energization of the air motor of the tool. Advancement of a conventional drive head effects engagement of the insert and drive thereof into the workpiece. The tool is provided with a novel feed strip cutoff mechanism to dispose of empty feed strip after it passes through the drive station of the tool.

BRIEF DESCRIPTION OF THE DRAWINGS

FIG. 1 is an elevational view, partially in section, of a semi-automatic insert tool of the instant invention.

FIG. 2 is a view, partially in section, taken in the direction 2 of FIG. 1.

FIG. 3 is an enlarged view taken in the direction of the arrow 3 of FIG. 1.

FIG. 4 is an enlarged view taken within the circle 4 of FIG. 1.

FIG. 5 is a view of the strip spool that is acceptable in the magazine shown in FIG. 1 of the drawings.

DETAILED DESCRIPTION OF THE PREFERRED EMBODIMENT OF THE INVENTION

As best seen in FIG. 1 of the drawings, a semi-automatic helical insert tool 10 comprises a frame 12 having a pistol grip 14 thereon to facilitate hand operation of the tool 10. The frame 12 has a cylindrical recess 16 therein for the acceptance of a conventional air motor 18. The air motor 18 is similar to the motor disclosed in U.S. Pat. No. 3,579,793 and reference should be made thereto for details. The air motor 18 has a conventional air inlet nozzle 20 for connection to a source of high pressure air, not shown.

The air motor 18 is actuated by an air control valve actuator 22 which in turn is actuated by a trigger pivot 24. The trigger pivot 24 is biased to the on position, as seen in FIG. 1 of the drawings, by a cam surface 26 of a trigger 28. The trigger is orientated relative to the handle 14 to facilitate operation thereof by the finger of an operator.

The trigger 28 is connected through a ratchet pull rod 30 to a ratchet bracket 32. The ratchet pull rod 30 is normally biased to the left, as seen in FIG. 1 of the drawings, by helical compression spring 34 which exerts a bias in the opposite direction to that of the finger of an operator within the trigger 28.

Movement of a ratchet arm 36 on the bracket 32 to the right under the bias of the trigger 28 effects movement of a pin 40 thereon to the right. The pin 40 is engaged in complementary teeth 42 in an index gear 44. The index gear 44 is journaled on a shaft 46, as is a feed dial 48. The index gear 44 and feed dial 48 are pinned to one another for concomitant rotation so as to effect feed of a feed strip 50, as will be described.

The feed dial 48 is provided with a plurality of radially outwardly extending dogs 52 which are acceptable in complementary notches 54 in the feed strip 50. Each reciprocation of the pin 40 on the ratchet arm 36 to the right, as seen in FIG. 1 of the drawings, effects advancement of one helical insert 56 into a feed position coaxial with the axis of rotation of the air motor 18. An insert drive assembly 60 is provided on the front end of the air motor 18 which is similar to that disclosed in U.S. Pat. No. 3,579,793, which forms no part of the instant invention.

As best seen in FIG. 4 of the drawings, the drive assembly 60 of the air motor 18 is provided with a cutoff mechanism for empty feed strip. More particularly, a cutoff blade 62 is journaled on a cylindrical end portion 64 of the drive assembly 60. A cutting edge 66 on the cutoff blade 62 is advanced relative to the feed strip 54 by a hand lever 68. Rotation of the lever 68 effects rotation of an eccentric 69 relative to the drive assembly end portion 64 and advancement of the cutting edge 66 into engagement with the feed tape 54 thereby to cut the empty tape 54.

As seen in FIG. 5 of the drawings, a spool 70 accommodates two coils of feed strip 54. As seen in FIG. 2, the feed strips 54 on the spool 70 are fed to the drive assembly of the tool 10 one at a time, the strips 54 being manually inserted into a complementary slot 72 in a strip guide 74 to effect loading.

While the preferred embodiment of the invention has been disclosed, it should be appreciated that the invention is susceptible of modification without departing from the scope of the following claims.

I claim:
1. A semi-automatic helical insert tool comprising
a frame,
a motor on said frame having an insert driving head thereon,
a feed strip having a plurality of drive notches therein,
a plurality of inserts in said feed strip,
a circular magazine on said frame having a rotatable spool therein for supporting said feed strip,
a feed dial having teeth engageable in the notches in said feed strip,
a manually operable trigger,
mechanical means comprising an index gear having ratchet teeth thereon rotatable with said feed dial, and a pawl actuatable by said trigger and engageable with said ratchet teeth, said means being actuatable upon a predetermined first increment of travel of said trigger in one direction for advancing said feed dial and one insert on said feed strip to a drive position in alignment with the tool on said motor each time said trigger is pulled, and
control means for said motor energizable upon a predetermined travel of said trigger in said one direction to energize said motor to advance said tool into engagement with an insert and advance said insert into a workpiece.

* * * * *

UNITED STATES PATENT OFFICE
CERTIFICATE OF CORRECTION

PATENT NO. : 4,449,283

DATED : May 22, 1984

INVENTOR(S) : Imre Berecz et al

It is certified that error appears in the above-identified patent and that said Letters Patent are hereby corrected as shown below:

On the abstract page at "[21]" "Appl. No.: 369,022" should be --Appl. No.: 389,022--.

Signed and Sealed this

Twenty-fifth Day of September 1984

[SEAL]

Attest:

GERALD J. MOSSINGHOFF

*Attesting Officer*     *Commissioner of Patents and Trademarks*